United States Patent
Uimonen et al.

(10) Patent No.: US 11,459,805 B2
(45) Date of Patent: Oct. 4, 2022

(54) LATCH MECHANISM

(71) Applicant: MOBILITY HOLDINGS, LIMITED, Causeway Bay (HK)

(72) Inventors: Joakim Uimonen, Causeway Bay (HK); Eric Yi-Hung Lin, Causeway Bay (HK)

(73) Assignee: MOBILITY HOLDINGS, LIMITED, Causeway Bay (HK)

( * ) Notice: Subject to any disclaimer, the term of this patent is extended or adjusted under 35 U.S.C. 154(b) by 304 days.

(21) Appl. No.: 16/572,070

(22) Filed: Sep. 16, 2019

(65) Prior Publication Data

US 2020/0190874 A1   Jun. 18, 2020

(30) Foreign Application Priority Data

Dec. 14, 2018 (CN) .......................... 201811533392.2

(51) Int. Cl.
*E05C 1/12* (2006.01)
*B62K 15/00* (2006.01)

(52) U.S. Cl.
CPC .............. *E05C 1/12* (2013.01); *B62K 15/006* (2013.01)

(58) Field of Classification Search
CPC ..... E05B 2063/0026; E05B 2015/0235; E05B 63/121; E05B 17/2011; E05B 17/2019; E05B 17/0033; E05B 1/12; E05C 19/009; E05C 1/12; Y10T 292/57; Y10T 292/14; Y10T 292/1016

See application file for complete search history.

(56) References Cited

U.S. PATENT DOCUMENTS

| | | | |
|---|---|---|---|
| 6,336,649 B1 | 1/2002 | Lin | |
| 9,500,011 B2* | 11/2016 | Krajenke | .................. E05C 1/06 |
| 9,856,058 B1* | 1/2018 | Arthurs | .................. E05B 1/0092 |
| 10,309,126 B2* | 6/2019 | Do | .......................... E05B 63/06 |
| 10,385,895 B2* | 8/2019 | Fiedler | .................. E05B 47/004 |
| 2021/0087855 A1* | 3/2021 | Megidesh | ............... E05B 47/06 |

FOREIGN PATENT DOCUMENTS

| | | | | |
|---|---|---|---|---|
| CN | 1926344 A | * | 3/2007 | .............. F16B 21/16 |
| DE | 102006007691 B3 | * | 6/2007 | .......... E05B 47/0011 |
| DE | 202010008985 U1 | * | 3/2011 | .............. B25H 3/022 |
| DE | 202014103252 U1 | * | 11/2015 | .......... E05B 63/121 |
| EP | 0032789 A1 | | 7/1981 | |
| GB | 406811 | | 3/1934 | |

* cited by examiner

*Primary Examiner* — Kristina R Fulton
*Assistant Examiner* — Noah Horowitz
(74) *Attorney, Agent, or Firm* — Muncy, Geissler, Olds & Lowe, P.C.

(57) ABSTRACT

A latch mechanism includes a first and second latch body. The first and second latch body respectively includes a first and second base, a first and second latch portion and a first and second acting portion. The first latch body disposes through the second base. The second acting portion is pivoted to the second base. The second latch portion is disposed on the rotational path and limited to the first latch portion. The second acting portion includes a first and a second pushing structure. When the second acting portion is rotated along the rotational path, the second latch portion is pushed by the first pushing structure such that the second latch portion is disengaged from the first latch portion, and then the first acting portion is pushed by the second pushing structure such that the first latch body is disengaged from the second latch body in a releasing direction.

9 Claims, 9 Drawing Sheets

LATCH MECHANISM

BACKGROUND OF THE INVENTION

1. Field of the Invention

The present invention relates to a latch mechanism, particularly to a latch mechanism that can be assembled and disassembled easily.

2. Description of the Related Art

Latch mechanisms are commonly used to lock or secure two detachable components in order to facilitate the assembly or disassembly of the two components. Specifically, when two detachable components are assembled, the existing latch mechanism mostly uses a screw-free latch-on design to meet the trend of humanization. The purpose of the screw-free design is to reduce the cumbersome assembly process and eliminate the need for additional tools during the disassembly process.

SUMMARY OF THE INVENTION

It is a major objective of the present invention to provide a latch mechanism with the effect of easy assembly and disassembly.

To achieve the above objective, the present invention provides a latch mechanism used for engaging a first member and a second member. The latch mechanism includes a first latch body disposed on the first member and a second latch body disposed on the second member. The first latch body includes a first base, a first latch portion, and a first acting portion. The first base is coupled to the first member, and the first latch portion is disposed between the first base and the first acting portion. The second latch body includes a second base, a second latch portion, and a second acting portion. The second base is coupled to the second member, and the first latch body is disposed through the second base. The second acting portion is pivoted to the second base along an axis of rotation and adapted to rotate along a rotational path. The second latch portion is disposed on the rotational path and limited to the first latch portion. The second latch portion is disposed on the rotational path and limited to the first latch portion flexibly.

When the second acting portion is rotated, the second latch portion is driven by the second acting portion to move back and forth between an engaged position and a disengaged position to be engaged with or disengaged from the first latch portion. Specifically, the second acting portion includes a first pushing structure and a second pushing structure. The first acting portion is disposed on the rotational path. When the second acting portion is rotated along the rotational path, the second pushing structure is sequentially pushed by the first pushing structure such that the second latch portion is moved from the engaged position to the disengaged position. Then the first acting portion is pushed by the second pushing structure such that the first latch body is disengaged from the second latch body in a releasing direction.

In the present invention, the second latch portion includes a limiting structure, a third pushing structure, and a first elastic structure. The limiting structure is latched onto the first latch portion. The third pushing structure is coupled to the limiting structure, and the first elastic structure is coupled between the limiting structure and the second base.

In the present invention, the second latch portion moves back and forth between the engaged position and the disengaged position along a limiting path, the limiting structure and the first elastic structure are disposed along the limiting path, and the third pushing structure is coupled to the limiting structure in a direction perpendicular to the limiting path, where the direction is the same as the releasing direction.

In the present invention, when the limiting structure is limited to the first latch portion, the first pushing structure is disposed on the rotational path and located between the third pushing structure and the first acting portion.

In the present invention, when the first pushing structure pushes the third pushing structure such that the limiting structure is not latched onto the first latch portion, the second latch portion is moved from the engaged position to the disengaged position, and the first elastic structure is deformed from a released state to a compressed state. When the limiting structure is latched onto the first latch portion, the first elastic structure is in the released state. When the limiting structure is not latched onto the first latch portion, the first elastic structure is in the compressed state. The first elastic structure is a linear spring.

In the present invention, when the second acting portion is rotated along the rotational path and the second pushing structure is in contact with the first acting portion, the first pushing structure continues to push the third pushing structure to prevent the limiting structure from latching onto the first latch portion.

In the present invention, the second acting portion further includes a second elastic structure disposed between the second base and the second acting portion. When the second acting portion is rotated along the rotational path, the second elastic structure is deformed from a released state to a compressed state. When the second latch portion is latched onto the first latch portion, the second elastic structure is in the released state. When the second latch portion is not latched onto the first latch portion, the second elastic structure is in the compressed state. The second elastic structure is a torsion spring.

In the present invention, the second base is provided with a latch groove, and the first latch body is disposed through the latch groove.

In the present invention, the outer diameter of the first base and the first acting portion is greater than the outer diameter of the first latch portion, and the outer diameter of the first acting portion and the first latch portion is smaller than the inner diameter of the latch groove.

In the present invention, the first acting portion is a tapered structure, and the second acting portion is an operating handle.

Based on the above, in the present invention, the first latch body and the second latch body are respectively disposed on the first member and the second member. Through the engagement of the first latch portion of the first latch body and the second latch portion of the second latch body, the first latch body is engaged with the second latch body. Accordingly, the effect of assembling or engaging the first member and the second member can be achieved. Correspondingly, according to the present invention, the engagement of the first engaging portion and the second engaging portion can be released by operating the second acting portion of the second latch body. Then the first latch body can be disengaged from the second latch body. Accordingly, the effect of disassembling or disengaging the first member and the second member can be achieved.

DETAILED DESCRIPTION OF THE PREFERRED EMBODIMENT

Hereafter, the technical content of the present invention will be better understood with reference to preferred embodiments.

Figure 1:
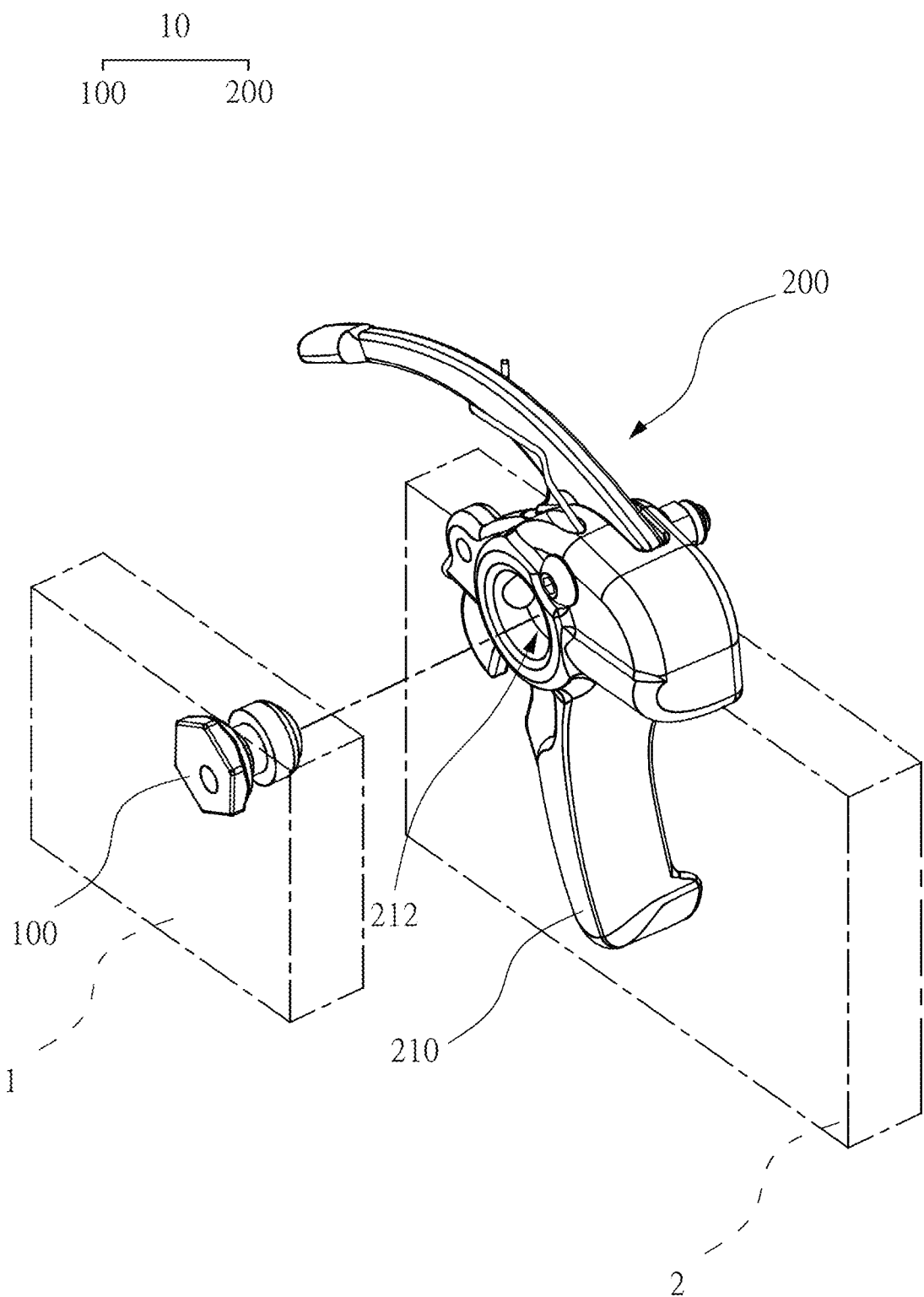
FIG. 1 is a schematic view showing a latch mechanism applied to a first member and a second member according to an embodiment of the present invention.
Figure 2:
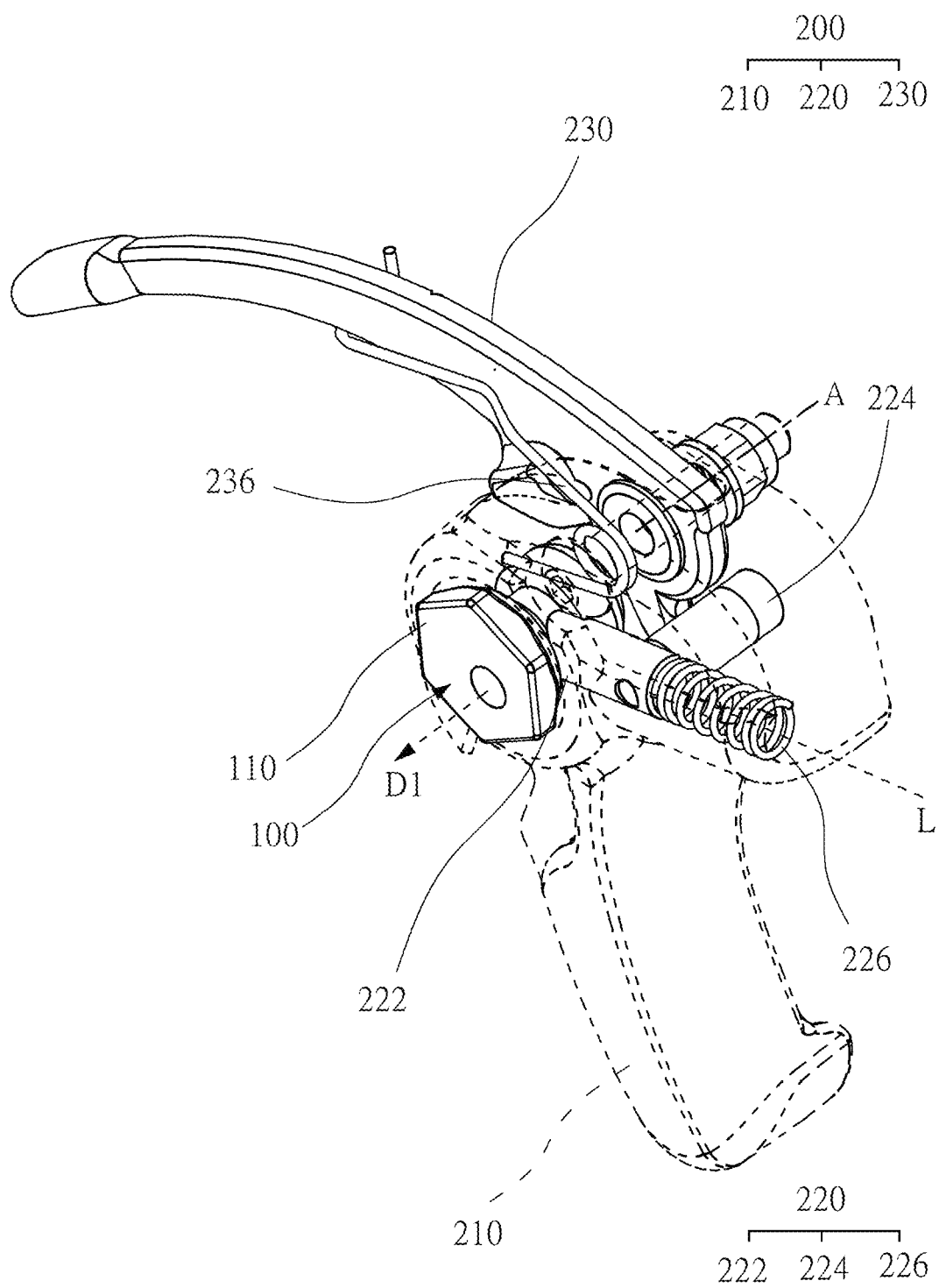
FIG. 2 is an assembly view of the latch mechanism in FIG. 1.
Figure 3:
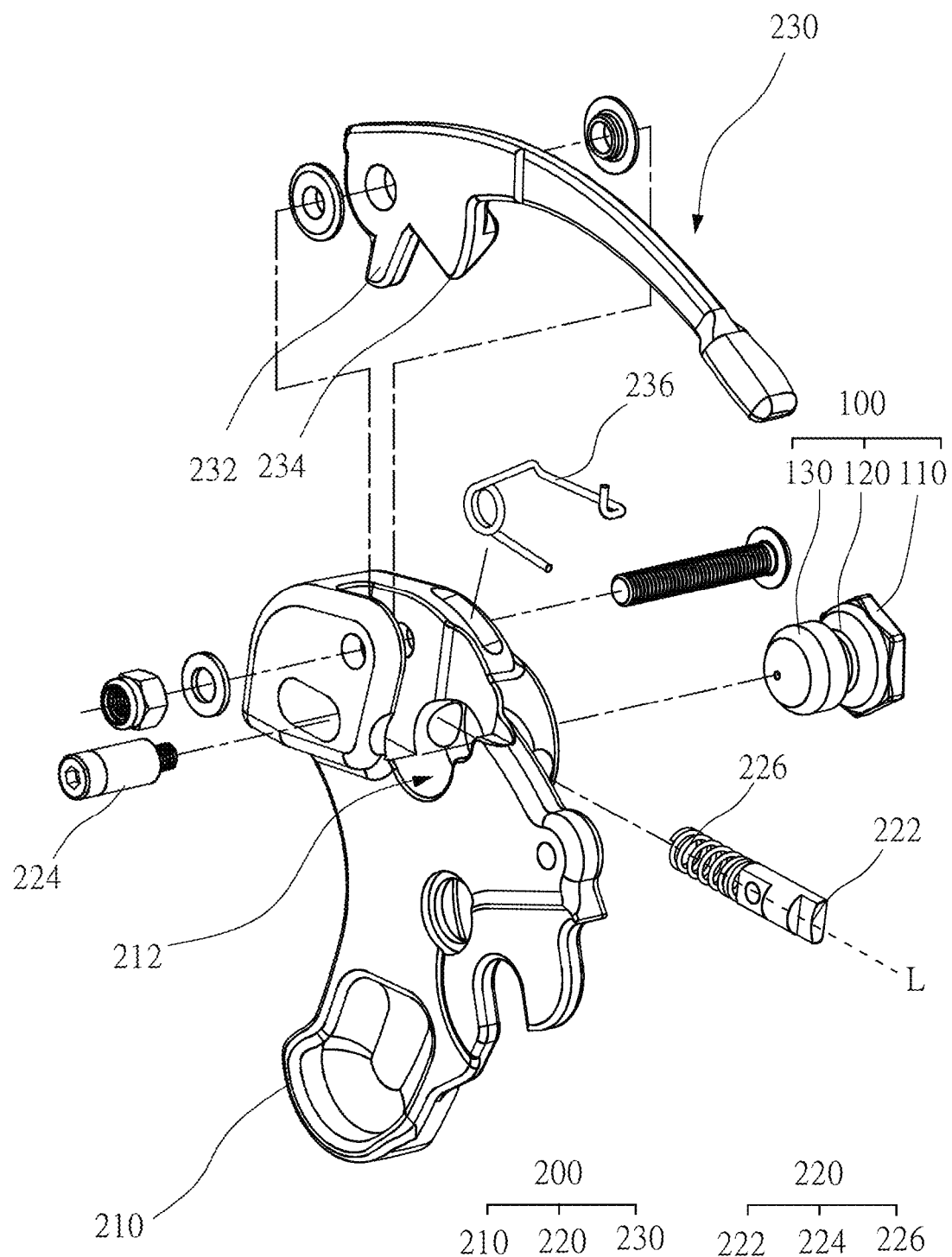
FIG. 3 is an exploded view of the latch mechanism in FIG. 2 from another viewing angle.
Figure 4:
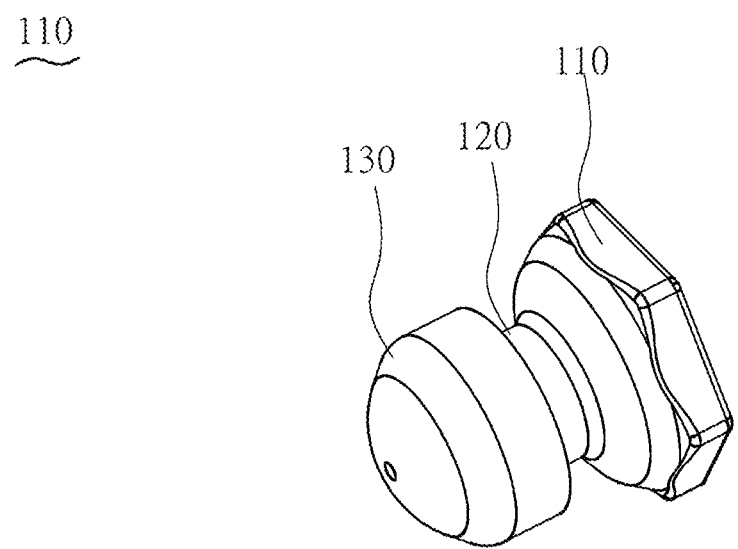
FIG. 4 is a schematic view of a first latch body in FIG. 2 from another viewing angle.
Figure 5:
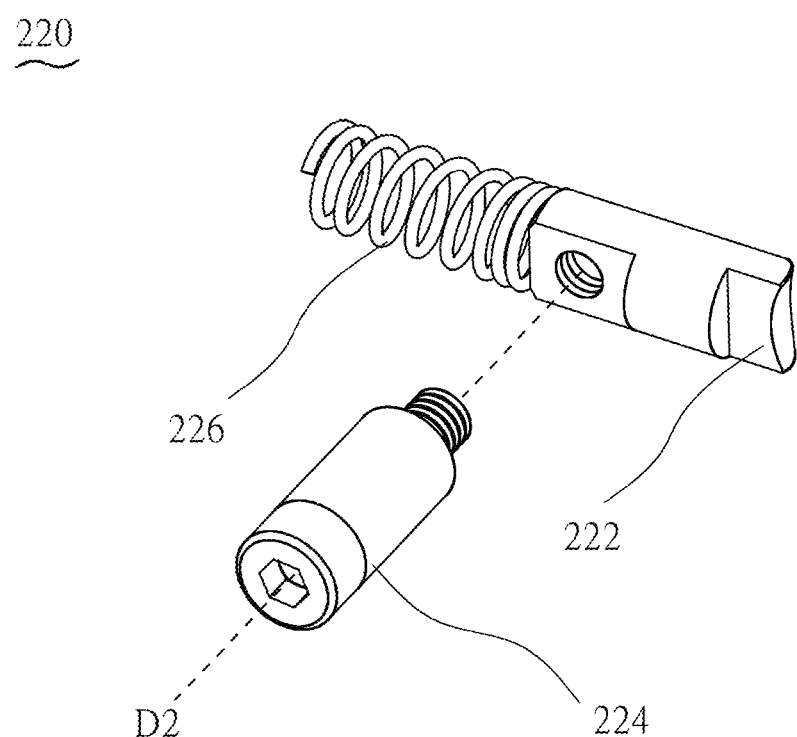
FIG. 5 is a schematic view of a second latch portion in FIG. 2 from another viewing angle.

FIG. 1 is a schematic view of a latch mechanism applied to a first member and a second member according to an embodiment of the present invention. FIG. 2 is an assembly view of the latch mechanism in FIG. 1. FIG. 3 is an exploded view of the latch mechanism in FIG. 2 from another viewing angle. FIG. 4 is a schematic view of a first latch body in FIG. 2 from another viewing angle. FIG. 5 is a schematic view of a second latch portion in FIG. 2 from another viewing angle. Please first refer to FIGS. 1, 2, 3, 4, and 5. The latch mechanism 10 of the present embodiment is used for latching a first member 1 and a second member 2, wherein the first member 1 and the second member 2 are, for example, a latch mechanism applied to a door piece or a latch mechanism of a folding bicycle, but they are not limited thereto. When the latch mechanism 10 is applied to a folding bicycle, the first member 1 is, for example, the front wheel portion of the bicycle, and the second member 2 is, for example, the rear wheel portion of the bicycle, but it is not limited thereto.

The latch mechanism 10 in the present embodiment includes a first latch body 100 disposed on the first member 1 and a second latch body 200 disposed on the second member 2. The first latch body 100 includes a first base 110, a first latch portion 120, and a first acting portion 130. The second latch body 200 includes a second base 210, a second latch portion 220, and a second acting portion 230. The second acting portion 230 is, for example, an operating handle. Specifically, the first base 110 is used to couple to the first member 1, and the second base 210 is used to couple to the second member 2.

In the present embodiment, the first latch body 100 is a second base 210 disposed through the second latch body 200. Accordingly, the first member 1 can be assembled or engaged with the second member 2 through the engagement of the first latch body 100 and the second latch body 200. Specifically, in the present embodiment, for example, a latch groove 212 is disposed on the second base 210. Therefore, the first latch body 100 can be disposed through the latch groove 212 to achieve assembly or engagement.

As described above, with regard to the structure of the first latch body 100, the first latch portion 120 is disposed between the first base 110 and the first acting portion 130. Specifically, the outer diameter of the first base 110 and the first acting portion 130 is greater than the outer diameter of the first latch portion 120. The first acting portion 130 is, for example, a tapered structure. In other words, the first latch body 100 is, for example, a narrower warhead structure in the middle section of the first latch body 100. Further, in the present embodiment, the outer diameter of the first acting portion 130 and the first latch portion 120 is, for example, less than the inner diameter of the latch groove 212. Therefore, the first acting portion 130 and the first latch portion 120 can be smoothly disposed through the latch groove 212 and cooperate (be engaged) with the second latch portion 220. This effectively achieves the effect of making the first latch body 100 and the second latch body 200 assemble or engage with each other. Correspondingly, according to the present embodiment, the first latch portion 120 can be disengaged from the second latch portion 220 by operating the second acting portion 230, such that the first latch body 100 can be disengaged from the second latch body 200 in a releasing direction D1. Accordingly, the first latch body 100 and the second latch body 200 are disassembled or disengaged from each other.

With regard to the structure of the second latch body 200, the second acting portion 230 is pivoted along the axis of rotation A to the second base 210 and adapted to rotate along a rotational path R. Specifically, the second acting portion 230 includes, for example, a first pushing structure 232 and a second pushing structure 234. The first acting portion 130 is, for example, disposed on the rotation path R. In addition, in this embodiment, the second latch portion 220 is also disposed on the rotation path R and is used to actively move on a limiting path L to limit the first latch portion 120. In detail, the second latch portion 220 of the present embodiment includes, for example, a limiting structure 222, a third pushing structure 224, and a first elastic structure 226. The first elastic structure 226 is, for example, a linear spring.

Specifically, the limiting structure 222 can be latched onto the first latch portion 120. The third pushing structure 224 is coupled to the limiting structure 222, for example, in a direction D2 perpendicular to the limiting path L. The direction D2 is, for example, the same as the releasing direction D1. Further, when the third pushing structure 224 is driven by the second acting portion 230, the limiting structure 222 is moved as well. In addition, the first elastic structure 226 is coupled between the limiting structure 222 and the second base 210.

Figure 6A:
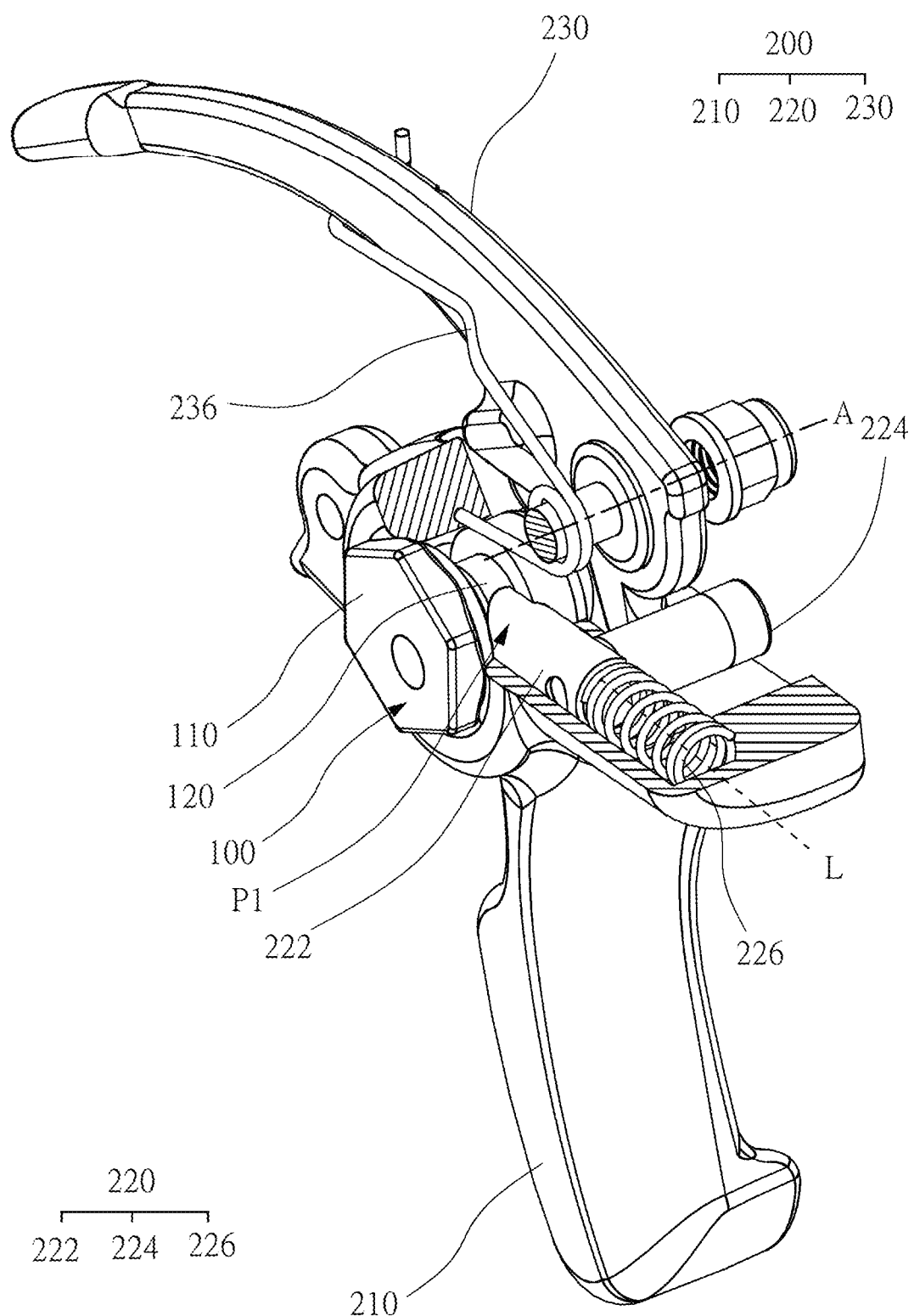
FIGS. 6A-6C are schematic views showing the operation flow of the latch mechanism in FIG. 2.
Figure 6B:
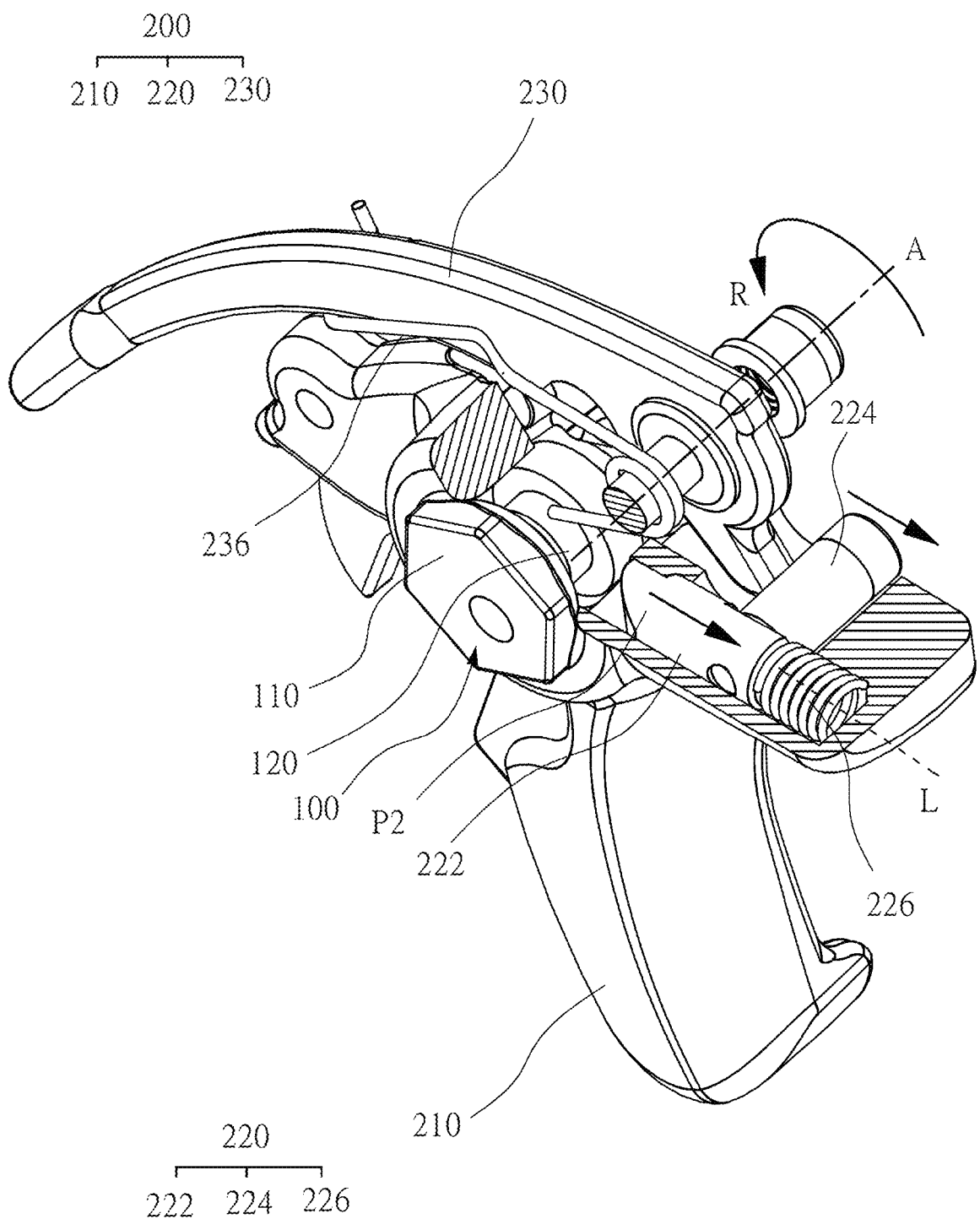
Figure 6C:
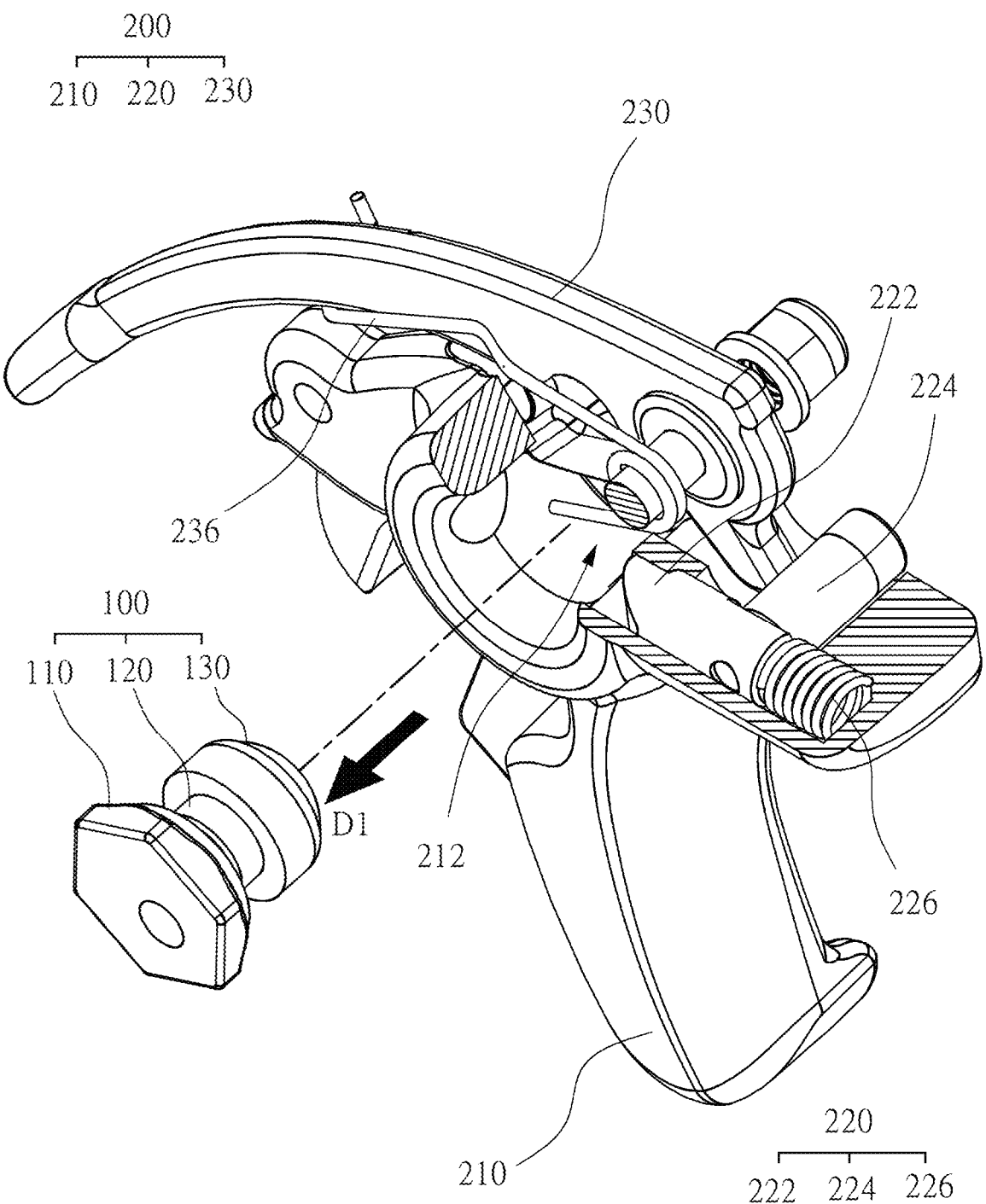
Figure 7A:
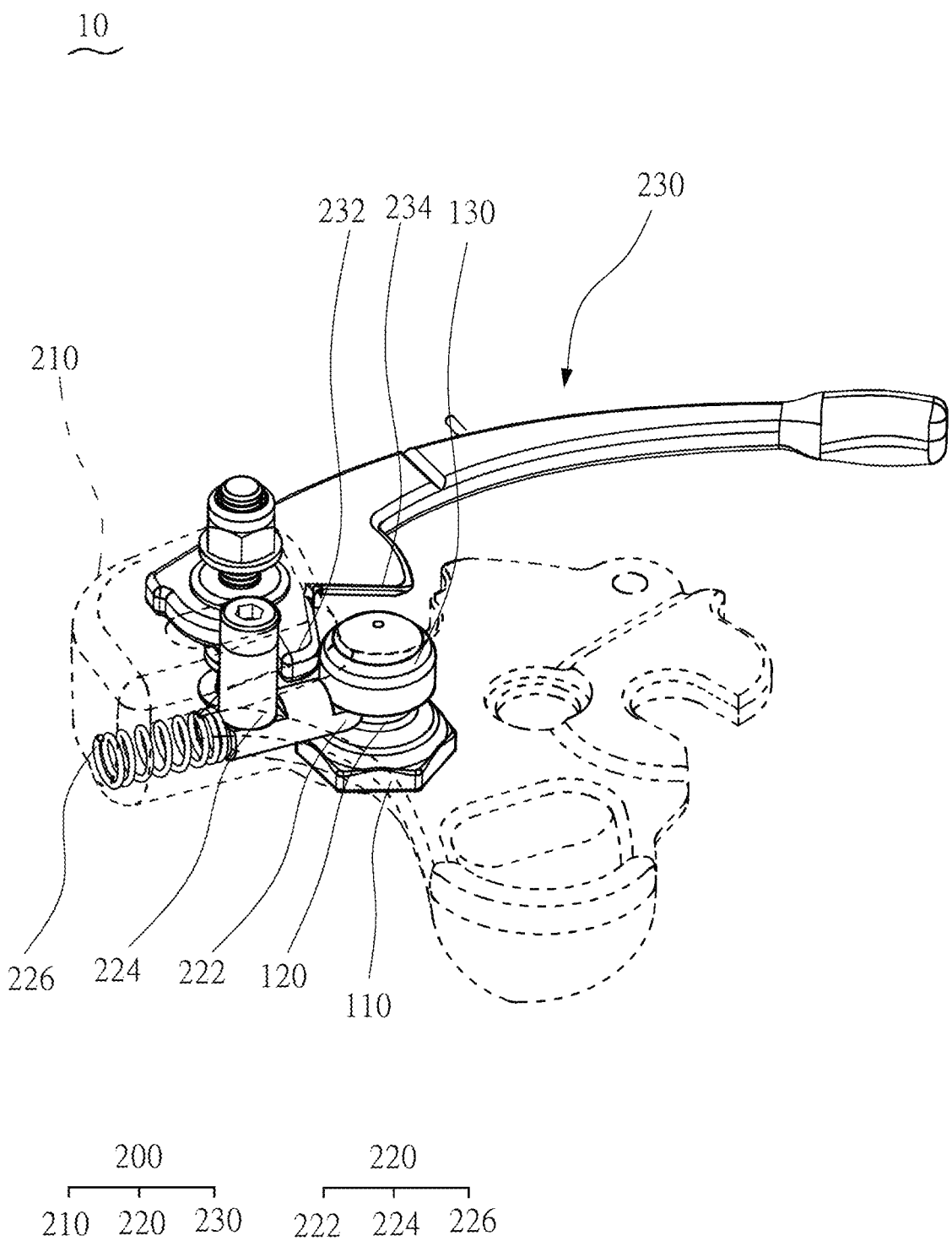
FIG. 7A is a schematic view of the latch mechanism in FIG. 6A from another viewing angle.
Figure 7B:
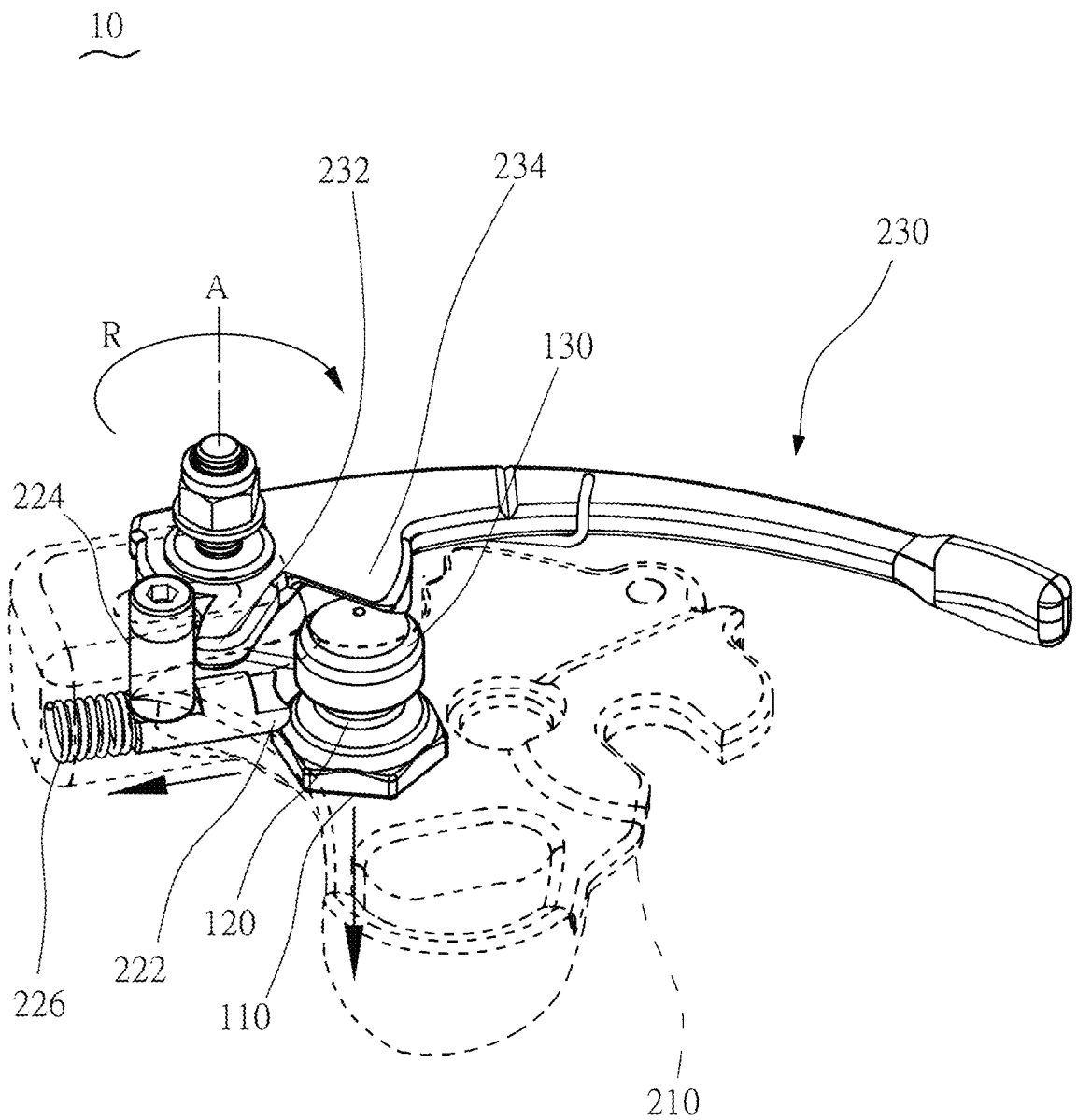
FIG. 7B is a schematic view of the latch mechanism in FIG. 6B from another viewing angle.

FIGS. 6A-6C are schematic views showing the operation flow of the latch mechanism in FIG. 2. FIG. 7A is a schematic view of the latch mechanism in FIG. 6A from another viewing angle. FIG. 7B is a schematic view of the latch mechanism in FIG. 6B from another viewing angle. Please refer to all of FIGS. 6A-6C and FIGS. 7A-7B. In the present embodiment, when the first latch body 100 and the second latch body 200 are assembled or coupled to each other (as shown in FIG. 6A and FIG. 7A), the limiting structure 222 is limited to the first latch portion 120, and the first pushing structure 232 is disposed on the rotational path R, and for example, between the third pushing structure 224 and the first acting portion 130.

Accordingly, when the second acting portion 230 is rotated by an external force (as shown in FIG. 6B and FIG. 7B), the second acting portion 230 is rotated along the rotational path R. It is worth mentioning that in the present embodiment, the rotation of the second acting portion 230 first causes the first pushing structure 232 to push the third pushing structure 224 of the second latch portion 220, such that the second latch portion 220 is moved on a limiting path L from an engaged position P1 (as shown in FIG. 6A) to a disengaged position P2 (as shown in FIG. 6B). In other words, when the second acting portion 230 is rotated, the second latch portion 220 is driven by the second acting portion 230 and moves back and forth between the engaged position P1 and the disengaged position P2 along the limiting path L to be engaged with or disengaged from the first latch portion 120. In particular, the limiting structure 222 and the first elastic structure 226 of the present embodiment are disposed, for example, along the limiting path L. Therefore, the second latch portion 220 can be moved back and forth in the limiting path L by the first elastic structure 226.

Specifically, when the first pushing structure 232 pushes the third pushing structure 224, the limiting structure 222 is not latched onto the first latch portion 120. When the second latch portion 220 is moved from the engaged position P1 to the disengaged position P2, the first elastic structure 226 is deformed from a released state (as shown in FIG. 6A) to a compressed state (as shown in FIG. 6B). That is, when the limiting structure 222 is latched onto the first latch portion 120, the first elastic structure 226 is in the released state. Correspondingly, when the limiting structure 222 is not latched onto the first latch portion 120, the first elastic structure 226 is in the compressed state.

After the rotation of the second acting portion 230 drives the first pushing structure 232 to push the third pushing structure 224 of the second latch portion 220 (as shown in FIG. 6B), based on the first acting portion 130 being, for example, disposed on the rotational path R, the second pushing structure 234 of the second acting portion 230 then pushes the first acting portion 130 (as shown in FIG. 6C). Because the first acting portion 130 is, for example, a tapered structure, and the first latch body 100 is, for example, disposed through the latch groove 212 in the releasing direction D1, the interaction between the second pushing structure 234 and the first acting portion 130 causes the first latch body 100 to be disengaged from the second latch body 200 in the releasing direction D1. Accordingly, the first latch body 100 and the second latch body 200 can be disengaged from each other, and thus the first member 1 and the second member 2 can be then conveniently disassembled or disengaged.

In order for the second pushing structure 234 of the second acting portion 230 to effectively push the first acting portion 130 such that the first latch body 100 is disengaged from the second latch body 200 in the releasing direction D1, when the second acting portion 230 is rotated along the rotational path R, and when the second pushing structure 234 is in contact with the first acting portion 130, the first pushing structure 232 continues to push the third pushing structure 224 to prevent the limiting structure 222 from engaging with the first latch portion 120. Therefore, in the case that the limiting structure 222 is not engaged with the first latch portion 120, the second pushing structure 234 can effectively push the first acting portion 130 to cause the first latch body 100 to be disengaged from the second latch body 200 in the releasing direction D1.

In a preferred embodiment, the second acting portion 230 further includes, for example, a second elastic structure 236. The second elastic structure 236 is disposed, for example, between the second base 210 and the second acting portion 230. Accordingly, when the second acting portion 230 is rotated along the rotational path R, the second elastic structure 236 is deformed from a released state (as shown in FIG. 6A) to a compressed state (as shown in FIG. 6B). In other words, when the second latch portion 220 is latched onto the first latch portion 120, the second elastic structure 236 is in the released state. Correspondingly, when the second latch portion 220 is not latched onto the first latch portion 120, the second elastic structure 236 is in the compressed state. Specifically, the second elastic structure 236 is, for example, a torsion spring.

After the first latch body 100 and the second latch body 200 are disengaged from each other, the first latch body 100 can be inserted into the latch groove 212 in the opposite direction to the releasing direction D1. It can be understood that after the first latch body 100 and the second latch body 200 are disengaged from each other, then due to the first elastic structure 226, the limiting structure 222 of the second latch body 200 returns to the above-mentioned engaged position P1. The engaged position P1 is, for example, disposed at the latch groove 212 or at the corresponding projection position of the latch groove 212. Similarly, the second acting portion 230 can also return to the initial position before the movement by means of the second elastic structure 236. Therefore, when the first latch body 100 is inserted back into the latch groove 212 in the direction opposite to the releasing direction D1, the first acting portion 130 first pushes against the limiting structure 222. Specifically, due to the elastic force of the first elastic structure 226, the limiting structure 222 continues to abut the surface of the first latch body 100. When the first latch body 100 continues to be inserted into the latch groove 212, the limiting structure 222 comes in contact with the surface of the first latch portion 120 instead of being in contact with the surface of the first acting portion 130. As both the outer diameter of the first base 110 and the outer diameter of the first acting portion 130 are greater than the outer diameter of the first latch portion 120, the limiting structure 222 of the second latch portion 220 is engaged with the first latch portion 120 again. Accordingly, the first latch body 100 and the second latch body 200 are again assembled or engaged with each other.

As above, in the present invention, the first latch body and the second latch body are respectively disposed on the first member and the second member. Through the latching between the first latch portion of the first latch body and the second latch portion of the second latch body, the first latch body is latched onto the second latch body. Accordingly, the effect of assembling or engaging the first member with the second member can be achieved. Correspondingly, according to the present invention, the engagement of the first engaging portion and the second engaging portion can be released by operating the second acting portion of the second latch body. Then the first latch body can be disengaged from the second latch body. Accordingly, the effect of disassembling or disengaging the first member and the second member can be achieved.

It should be noted that the described embodiments are only for illustrative and exemplary purposes and that various changes and modifications may be made to the described embodiments without departing from the scope of the invention as disposed by the appended claims.

What is claimed is:

1. A latch mechanism, used for latching a first member and a second member, the latch mechanism comprising:
   a first latch body, disposed on the first member, including a first base, a first latch portion, and a tapered structure, wherein the first base is coupled to the first member and the first latch portion is disposed between the first base and the tapered structure; and a second latch body, disposed on the second member, including a second base, a second latch portion, and an operating handle, wherein the second base is coupled to the second member and the first latch body is disposed through the second base, the is an operating handle is pivoted to the second base along an axis of rotation and adapted to rotate along a rotational path, and the second latch portion is disposed on the rotational path and confined within the second base; when the operating handle is rotated, the second latch portion is driven by the operating handle to move back and forth between an engaged position and a disengaged position to be engaged with or disengaged from the first latch portion;

wherein the operating handle includes a first pushing structure and a second pushing structure, the tapered structure, the first pushing structure and the second pushing structure are disposed on the rotational path, and when the operating handle is rotated along the rotational path, the second latch portion is pushed by the first pushing structure first such that the second latch portion is moved from the engaged position to the disengaged position, and then the tapered structure is pushed by an inclined surface of the second pushing structure such that the first latch body is disengaged from the second latch body in a releasing direction.

2. The latch mechanism as claimed in claim 1, wherein the second latch portion includes a limiting structure, a third pushing structure, and a first elastic structure, the limiting structure is latched onto the first latch portion, the third pushing structure is coupled to the limiting structure, and the first elastic structure is coupled between the limiting structure and the second base.

3. The latch mechanism as claimed in claim 2, wherein the second latch portion moves back and forth between the engaged position and the disengaged position along a limiting path, the limiting structure and the first elastic structure are disposed along the limiting path, and the third pushing structure is coupled to the limiting structure in a direction perpendicular to the limiting path, where the direction is the same as the releasing direction.

4. The latch mechanism as claimed in claim 2, wherein when the limiting structure is confined with the first latch portion, the first pushing structure is disposed on the rotational path and located between the third pushing structure and the tapered structure.

5. The latch mechanism as claimed in claim 2, wherein when the first pushing structure pushes the third pushing structure such that the limiting structure is not latched onto the first latch portion, the second latch portion is moved from the engaged position to the disengaged position and the first elastic structure is deformed from a released state to a compressed state; when the limiting structure is latched onto the first latch portion, the first elastic structure is in the released state; when the limiting structure is not latched onto the first latch portion, the first elastic structure is in the compressed state, and the first elastic structure is a linear spring.

6. The latch mechanism as claimed in claim 2, wherein when the operating handle is rotated along the rotational path and the inclined surface of the second pushing structure is in contact with the tapered structure, the first pushing structure continues to push the third pushing structure to prevent the limiting structure from being engaged with the first latch portion.

7. The latch mechanism as claimed in claim 1, wherein the operating handle further comprises a second elastic structure disposed between the second base and the operating handle, and when the operating handle is rotated along the rotational path, the second elastic structure is deformed from a released state to a compressed state; when the second latch portion is latched onto the first latch portion, the second elastic structure is in the released state; when the second latch portion is not latched onto the first latch portion, the second elastic structure is in the compressed state, and the second elastic structure is a torsion spring.

8. The latch mechanism as claimed in claim 1, wherein the second base is provided with a latch groove, and the first latch body is disposed through the latch groove.

9. The latch mechanism as claimed in claim 8, wherein the outer diameter of the first base and the outer diameter of the tapered structure are greater than the outer diameter of the first latch portion, and the outer diameter of the tapered structure and the first latch portion is smaller than the inner diameter of the latch groove.

* * * * *